April 16, 1946.                H. L. DECKER                 2,398,624
                          LIGHT TRANSMITTING ELEMENT
                            Filed Dec. 17, 1943
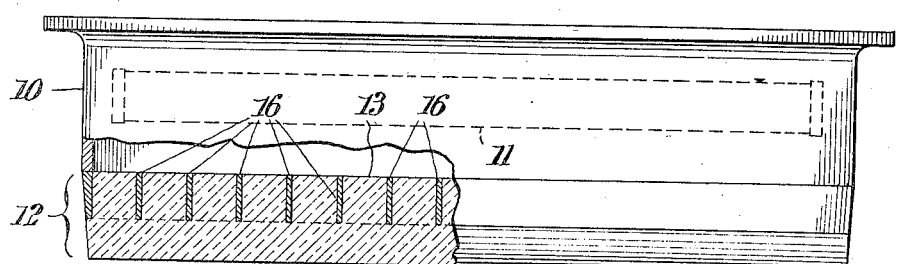
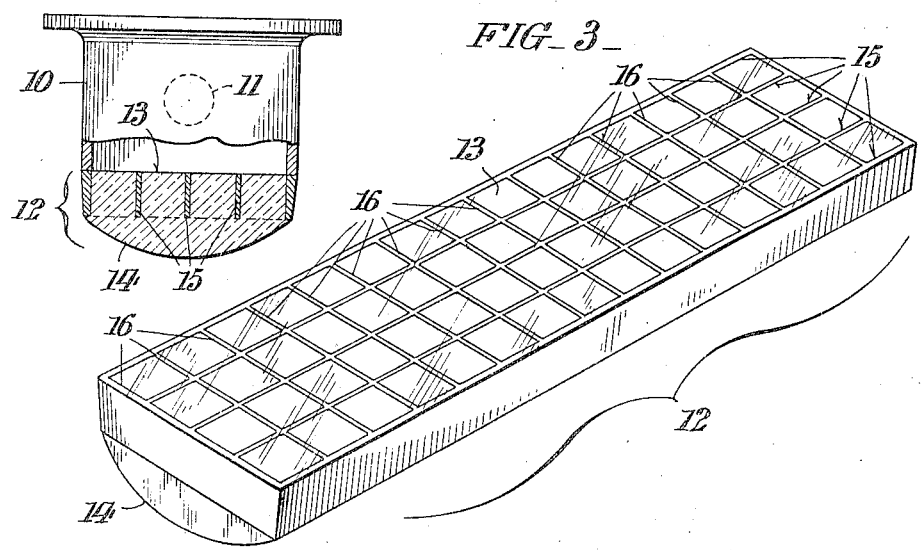
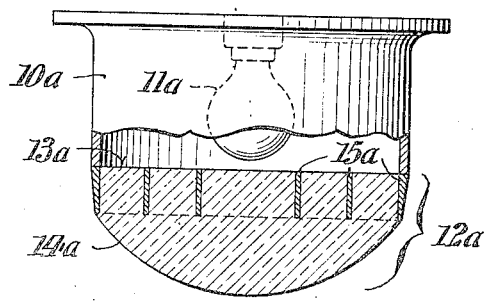
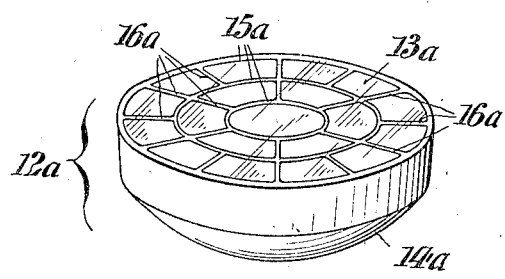
INVENTOR:
Harry L. Decker,
BY
ATTORNEYS.

Patented Apr. 16, 1946

2,398,624

UNITED STATES PATENT OFFICE 2,398,624

LIGHT TRANSMITTING ELEMENT

Harry L. Decker, Ardmore, Pa., assignor to The Pennsylvania Railroad Company, Philadelphia, Pa., a corporation of Pennsylvania Application December 17, 1943, Serial No. 514,646

5 Claims. (Cl. 240—78)

This invention relates to light transmitting elements, and has reference more particularly to light transmitting elements useful in connection with lighting fixtures.

The chief aim of my invention is to make it possible to combine in an element of the kind referred to the properties of light transmission and of apportionment for passage through definite channels in order that the illumination from a light source may be confined to a more or less definite area. This objective is attained in practice as hereinafter more fully disclosed through provision of a light transmitting element with an incorporated grid formed either from translucent or opaque material which sets apart a plurality of channels for traverse of the projected light rays, and which affords reflecting surfaces whereby the rays are diffused in traversing said channels.

Another aim of my invention is to secure the foregoing advantages in a light transmitting element which lends itself to ready and economic fabrication throughout from plastic material, and which is characterized by having smooth bounding surfaces so that it can be easily cleaned.

Other objects and attendant advantages will appear from the following description of the attached drawing, wherein Fig. 1 is a view partly in side elevation and partly in longitudinal section of a rectangular overhead lighting fixture with a light transmitting cover element embodying my invention.

Fig. 2 is a view showing the fixture partly in end elevation and partly in cross section.

Fig. 3 is a perspective view of the light transmitting element of the fixture illustrated in Figs. 1 and 2.

Fig. 4 is a view corresponding to Fig. 1 of a circular or dome lighting fixture with a light transmitting element having the attributes above pointed out; and Fig. 5 is a perspective view of the light transmitting element of the dome fixture of Fig. 4.

The ceiling light fixture illustrated in Figs. 1 and 2 for convenience of exemplification has an elongate rectangular casing 10 which houses a horizontally-disposed neon lamp 11 and which is closed by a light transmitting element 12 constructed in accordance with my invention. As best shown in Fig. 3 the element 12 is made to rectangular configuration to fit over the open bottom of the casing 10 and constructed for the most part from transparent material with a flat top surface 13 and a rounded outer surface 14. Imbedded in the transparent material is a grid which may be either of translucent or opaque material, the same having longitudinal and cross bars 15 and 16 and extending, in the illustrated instance, only part way through the body of the element. However if found convenient or desirable, the grid may be extended all the way down through the body of the element. Appropriate means, not shown, are provided in practice for securing the element to the housing 10 with capacity for removal or retraction so that ready access may be had to the lamp 11 when necessary. While glass may be employed as a material for the body of the element and metal for the grid, I prefer to form these components both from a suitable plastic so as to be less liable to fracture. Due to having smooth flush exterior surfaces, it will be apparent that the element is easily kept clean. Through the medium of the grid the light from the tube 11 is subdivided and obliged to traverse a plurality of definite channels whereof the side walls function as reflecting surfaces to effect diffusion. The illumination is accordingly confined to cover a more or less definite area by the action of the grid.

In Fig. 4 I have illustrated my invention in connection with a dome fixture whereof the casing 10a is annular and houses an ordinary incandescent lamp 11a. As shown in perspective in Fig. 5, the light transmitting cover element 12a for the dome lamp is made to circular configuration to fit the casing 10a and has an imbedded grid with spaced annular ribs 15a and radial bars 16a. As in the first described embodiment, the inner face of the element 12a is flat and the outer surface convexed.

While in both instances, the light transmitting element is shown as having a lens-like cross section, it is to be understood that it may be otherwise cross sectionally shaped depending upon the character of light modification desired in the illumination from the lamp.

Having thus described my invention, I claim:

1. A light transmitting element of light permeable material having a body with a flat top side adapted for exposure to a source of illumination, and a convex bottom side; and an embedded grille-like grid of non-transparent material with plural intersecting webs or bars of uniform depth aligned in the direction of light transmission, said webs or bars extending down through the light permeable element from the back thereof but terminating short of its rounded side.

2. The invention according to claim 1, in which the body of the transmitting element is of oblong configuration and is transversely convex at the bottom.

3. The invention according to claim 1, in which the body is formed from transparent plastic, and the grid from translucent plastic.

4. The invention according to claim 1, in which the body of the transmitting element is annular; and in which the grid has radial and concentric webs as partitions.

5. The invention according to claim 1, in which the body of the transmitting element is annular; in which the grid has radial and concentric webs as partitions; in which the body is formed from transparent plastic; and the grid from translucent plastic.

HARRY L. DECKER.